United States Patent Office 2,758,108
Patented Aug. 7, 1956

2,758,108

PREPARATION OF ADDUCT OF UREA OR THIOUREA IN THE PRESENCE OF AN AQUEOUS SOLUTION OF MONOETHYLAMINE

Joseph I. Ackerman, Jr., Bartlesville, Okla., assignor to Phillips Petroleum Company, a corporation of Delaware No Drawing. Application April 10, 1950,
Serial No. 155,134

7 Claims. (Cl. 260—96.5)

This invention relates to a process for the separation of one class of organic compounds from another class of organic compounds. In one of its aspects, it relates to a process for the separation of a straight carbon atom chain organic compound from a branched carbon atom chain and/or an aromatic organic compound by the selective formation of adducts of said straight carbon atom chain organic compounds with urea in the presence of a nitrogenous compound. In another of its aspects, this invention relates to a process for the separation of a branched carbon atom chain organic compound from admixture with a straight carbon atom chain and/or an aromatic organic compound by selectively forming an adduct between the branched-chain organic compound and thiourea in the presence of a nitrogenous compound. In still another of its aspects, this invention relates to a process for activating urea and thiourea with an organic nitrogen compound to thereby enhance the adduct-forming properties of said urea and thiourea. In yet another of its aspects, this invention relates to a process for preparing an adduct of urea with a straight carbon atom chain organic compound or an adduct of thiourea with a branched carbon atom chain compound in the presence of a nitrogenous activator.

It has now been found that in reacting a straight carbon atom chain organic compound with urea ($CO(NH_2)_2$) to form a solid adduct therebetween, the urea will produce such an adduct with greater ease in the presence of an activator which comprises a nitrogenous compound than in the absence of such an activator.

It has also been found that thiourea ($SC(NH_2)_2$) will selectively form adducts with a branched carbon atom chain compound in the presence of an nitrogenous activator but will not form an adduct with a straight carbon atom chain compound despite the presence of such activator. Thus, thiourea will form an adduct with iso-octane but will not form an adduct with n-octane. The adduct-forming property of such activated thiourea is thus seen to be opposite that of the thus activated urea, namely, thiourea forms an adduct with branched-chain organic compounds while urea does not and, further, thiourea does not form adducts with straight-chain organic compounds while urea will form adducts therewith.

It has been further found that thiourea, like urea, can be activated to produce its adducts with greater ease by carrying out the adduct-forming reaction in the presence of a nitrogenous compound such as an alkyl amine.

Still further, it has been found that a straight carbon atom chain organic compound can be readily and efficiently separated from its admixture with a branched carbon atom chain and/or an aromatic organic compound by causing the straight-chain compound to form an adduct in the present of an activator comprising a nitrogen-containing compound which adduct can then be readily separated from the branched-chain and/or aromatic organic compounds which do not form adducts with the urea. Also, it has been found that a branched carbon atom chain organic compound can be separated from its admixture with a straight carbon atom chain and/or an aromatic organic compound by causing the branched-chain organic compound to form an adduct with thiourea in the presence of an activator comprising a nitrogen compound which adduct can then be readily separated from the straight-chain or aromatic compound which does not form an adduct with thiourea.

Thus, according to this invention, there is provided a process for the separation of a straight carbon atom chain organic compound from its admixture with a branched carbon atom chain and/or an aromatic organic compound which comprises forming an adduct between said straight-chain organic compound and urea in the presence of an activating nitrogenous compound. Further, according to this invention, there is provided a process for the separation of a branched carbon atom chain organic compound from its admixture with a straight carbon atom chain and/or an aromatic organic compound which comprises forming an adduct between said branched-chain organic compound and thiourea in the presence of an activating nitrogenous compound. Still according to this invention, there is provided a process for the production of a straight carbon atom chain organic compound adduct with urea which comprises contacting said straight carbon atom chain organic compound with urea in the presence of an activating nitrogenous compound and a process for the production of a branched carbon atom chain organic compound adduct with thiourea which comprises contacting said branched carbon atom chain organic compound with thiourea in the presence of an activating nitrogenous compound. Still yet according to this invention, there is provided a process for activating urea and thiourea to enhance or to establish their adduct-forming properties with a straight carbon atom chain and branched carbon atom chain organic compound, respectively, which comprises contacting said urea and said thiourea with an activating nitrogenous compound.

Thus, according to this invention, the organic compound which is to be converted into an adduct or a mixture of such compound with other compounds is contacted with urea or with thiourea in the presence of an activator comprising a nitrogen-containing compound. As stated, a straight carbon atom chain organic compound forms an adduct with urea while a branched carbon atom chain organic compound forms an adduct with thiourea. The resulting adduct is a solid at the conditions employed in the process of this invention and can be easily separated from any remaining non-adduct forming compounds. The separated adduct can be readily decomposed by heat or by contact with warm water to yield the original organic compound which combined to form the adduct and the urea or thiourea, as the case may be. It is readily apparent that the adduct-forming properties of an organic compound can be advantageously utilized to separate a class of adduct-forming compounds from a class of non-adduct forming compounds.

The activating nitrogen-containing compound which can be employed to activate urea or thiourea in accordance with this invention should be selected from those which do not form an adduct with urea or thiourea, as the case may be, and should be further selected from those in which urea or thiourea, as the case may be, is soluble to an appreciable extent, say 5 per cent or more, or from those which are substantially soluble, say 5 per cent or more, in a mutual solvent, preferably water, in which urea or thiourea is likewise substantially soluble. It has been found that the nitrogen-containing compound can be ammonia either as liquid ammonia or a concentrated aqueous solution containing from 14 to 28 per cent or more of ammonia or it can be an ammonia derivative selected from those substituted ammonia compounds in which urea or thiourea, as the case may be, is soluble at least to the extent of 5 per cent by weight or from those which are soluble in a mutual solvent to the extent of at least 5 per cent by weight and in which mutual solvent the urea or thiourea is likewise soluble and such ammonia derivative can have the general formula of

wherein $R_1$, $R_2$ and $R_3$ are selected from the group consisting of hydrogen and of the organic radicals consisting of alkyl, alkylene, hydroxyalkyl, acyl and aminoalkyl radicals wherein any aliphatic carbon atom chain contains at least one but not more than five carbon atoms per radical; provided that not more than two of $R_1$, $R_2$ and $R_3$ can be hydrogen. Thus, $R_1$, $R_2$ and $R_3$ can all be the same or different organic radicals above enumerated or any one or two of $R_1$, $R_2$ and $R_3$ can be hydrogen with the remaining $R_1$, $R_2$ and/or $R_3$ being one of the above radicals. Representative of the group of compounds comprising a substituted ammonia are the alkyl amines wherein the alkyl group contains a total of from one to five carbon atoms such as mono-n-propyl, monomethyl, dimethyl, trimethyl, monoethyl, diethyl, monopropyl, di-n-propyl, monobutyl, and monopentyl amines; the alkylene amines wherein the alkylene group contains from two to five carbon atoms such as monovinyl, divinyl, monoallyl, monopropenyl, and monobutenyl amines; the alkyl-alkylene amines such as dimethylaminopropene, monoethylaminopropene and monopropylaminoethylene; the hydroxyalkyl amines such as monoethanolamine, diethanolamine, and monopropanolamine; the amino alkyl amines such as diethylenediamine, putrescine and codaverine; acyl amines or amides such as formamide and acetamide; the amines having radicals selected from two or three of the above enumerated radicals such as hydroxypropylaminoethane, propenylaminoethane and methoxyaminobutene.

In addition to ammonia and its derivatives as above illustrated, heterocyclic organic nitrogen base amines can be employed as activators. Among such compounds can be mentioned pyrrole, pyridine, piperidine, morpholine, the picolines, the collidines, quinoline, isoquinoline, indole, pyrimidine, pyrrolidine, pyrroline, pyridazine, pyrazole, pyrazoline and pyrazine.

As stated, the adducts of this invention are produced from various organic compounds and urea or thiourea in the presence of one or more of an activating nitrogen-containing compound. The activating nitrogen compound can be employed in a substantially pure state when a liquid and when the urea or thiourea is soluble therein or it can be admixed with a suitable mutual solvent in which both the urea or thiourea and the nitrogen base are soluble to an appreciable extent, say 5 per cent or more each. The use of a mutual solvent for the activating nitrogen compound is particularly effective when the activating nitrogen compound is highly viscous, a solid or when the urea or thiourea is not substantially soluble therein. The preferred mutual solvent is water. Other mutual solvents which do not form an adduct with the urea or thiourea and in which the urea and thiourea as well as the selected nitrogen-containing activator is soluble can readily be selected by mere routine test.

A mixture of two or more of the activating nitrogen compounds of this invention can be used to activate the urea of thiourea. Solutions of two or more of these nitrogen compounds can likewise be used.

The amount of activating nitrogen compound employed can vary over a wide range. Thus, the urea or thiourea can be dissolved in the activating nitrogen compound or in solutions thereof to form solutions of urea or thiourea varying in concentration from dilute to saturated. The amount of activating nitrogen compound or the amount of such compound dissolved in a solvent can be limited to that required to form a slurry of urea or thiourea crystals. Also, the amount can be further limited to that sufficient to wet the crystalline surfaces of the urea and thiourea. Thus, the amount of activating nitrogen compound employed can vary from that required to form a dilute solution of urea or thiourea to that required to merely wet the surfaces of the urea or thiourea crystals. The exact amount of activating nitrogen compound employed will depend upon the nature of the process in which the adduct is formed, the nature of the organic compound which is to form an adduct with the urea or the thiourea, the cost of the activating nitrogen compound and its ease of recovery. In any event, the exact amount in any given instance can be readily determined by mere routine test. However, it has been found that the amount of activating nitrogen compound can vary from about 0.01 to 20, preferably from about 0.1 to 5, still more preferably from about 0.2 to 2 mols per mol of urea or thiourea.

As stated, the urea or thiourea can be dissolved in one or more of the activating nitrogen compounds or in an admixture of such with another solvent when it is contacted with the straight-chain or branched-chain organic compounds. More preferably, the urea or thiourea is suspended as a slurry in such activating nitrogen compound with or without a solvent for said activating nitrogen compound. Alternatively, the urea or thiourea is merely sprayed with the activating nitrogen compound or a solution thereof. The amount of urea or thiourea employed with respect to the adduct forming organic compound should be within the range of from 1 to 25, preferably from 2 to 15 mols of urea or thiourea per mol of compound which forms an adduct therewith.

The organic compounds which form an adduct with urea or thiourea are many and varied. It has been found that urea activated with the activators of this invention will form an adduct with a straight carbon atom chain organic compound which has a straight aliphatic carbon atom chain containing from six to fifty carbon atoms therein and which can have other substituents such as hydroxyl, amine or a halogen radical attached to one of the two end carbon atoms. Thus, such straight-chain (normal) hydrocarbons as the paraffinic hydrocarbons containing from six to fifty carbon atoms, such as hexane, heptane, octane, nonane, decane, undecane, dodecane, tridecane, tetradecane, pentadecane, hexadecane, heptadecane, nonadecane, eicosane, heneicosane, docosane and progressively higher molecular weight straight-chain paraffins up to and including pentacontane; and the straight-chain (normal) olefins containing from six to fifty carbon atoms such as the hexenes, heptenes, octenes, nonenes, decenes, undecenes, dodecenes, tridecenes, tetradecenes, pentadecenes, hexadecenes, heptadecenes, nonadecenes, eicosenes, heneicosenes, docosenes and progressively higher molecular weight straight-chain olefins up to and including the pentacontenes all form adducts with the organic nitrogen base activated urea of this invention.

Urea activated with the activator of this invention will also form an adduct with straight-carbon atom chain primary alcohols containing from six to fifty carbon atoms such as hexanol, hexenol, heptanol, heptenol, octanol, octenol, nonanol, nonenol, undecanol, undecenol and progressively higher paraffinic and olefinic alcohols up to and including those having fifty carbon atoms. It will also form adducts with primary amines having as one substituent an alkyl group or an alkylene group containing at least eight carbon atoms arranged in a straight carbon atom chain as well as with straight carbon atom chain ketones having from six to fifty carbon atoms such as hexanone, heptanone, octanone, nonanone, decanone, undecanone, dodecanone, eicosanone, docosanone and pentacontanone and with alkyl bromides and alkenyl bromides corresponding in carbon atom structure to the above straight-chain hydrocarbons and alcohols. Further, it will form adducts with straight carbon atom chain esters of straight chain acids such as the methyl, ethyl, propyl, butyl, pentyl hexyl, heptyl, octyl, nonyl and decyl esters of hexanoic, heptanoic, octanoic, nonanoic, decanoic, undecanoic, dodecanoic and eicosanoic acids. Adducts can be formed with activated urea and the aliphatic mercaptans having from six to fifty carbon atoms arranged in a straight chain. Among such mercaptan compounds are hexyl mercaptan, heptyl mercaptan, octyl mercaptan, and other such mercaptans corresponding in molecular carbon atom structure to the above straight-chain hydrocarbons.

Such activated urea does not form adducts with organic compounds having less than six carbon atoms per molecule or having a branched or aromatic structure.

Thiourea activated with the nitrogen-containing activators of this invention will form adducts with a branched-chain organic compound which has a branched carbon atom chain containing from five to fifty carbon atoms in the straight-chain portion of the molecule and having a carbon atom side chain containing from one to twenty carbon atoms. Thus, branched-chain hydrocarbons such as the methyl pentanes, the ethyl pentanes, the dimethyl and trimethyl pentanes, isohexane, the ethyl hexanes, the di-, tri- and tetraethyl hexanes, the propyl hexanes, the methyl octanes, the ethyl and propyl octanes, iso-octane, and other alkyl paraffins such as the higher molecular weight alkyl paraffins such as methyl, ethyl, propyl, butyl and hexyl heptadecanes, eicosanes and pentacontanes as well as methyl pentenes, the ethyl pentenes, the dimethyl and trimethyl pentenes, the ethyl hexenes, the mono-, di-, tri- and tetramethyl and ethyl octenes and other alkyl olefins including the higher molecular weight alkyl olefins such as the methyl, ethyl, propyl, butyl and hexyl hexadecenes, decosenes and pentacontenes form adducts with thiourea activated according to this invention.

Thiourea activated according to this invention will also form adducts with branched-carbon atom chain alcohols containing from five to fifty carbon atoms in a straight carbon atom chain and from one to twenty carbon atoms in a side chain. The hydroxyl radical can be attached to the 1-position or to any other position. For example, there is included in this group of alcohols the methyl pentanols, the methyl hexanols, the ethyl and propyl hexanols, the methyl, ethyl, propyl and butyl heptanols, the methyl, ethyl, propyl and butyl octanols as well as such higher alcohols as dimethyl triethyl eicosanol, and tetramethyl propylisobutyl docosanol. The activated thiourea also forms adducts with branched carbon atom chain ketones having from four to fifty carbon atoms in the straight-chain portion of the molecule and having a carbon atom side chain containing from one to twenty carbon atoms such as diisobutyl ketone, the methylhexanones, the methyl and ethyl heptanones, the methyl and ethyl octanones, and the methyl, ethyl, propyl and butyl nonanones; with the branched carbon atom chain amines and with secondary and tertiary amines having from seven to fifty carbon atoms in the straight chain portion of the molecule and from one to twenty carbon atoms in a side chain such as methylheptyl amine, dimethyldiethyloctyl amine, cetyldimethyl amine, diheptyl amine and trioctyl amine. It also forms adducts with branched carbon atom chain aliphatic mercaptans having from six to fifty carbon atoms arranged in the straight chain portion of the molecule and having from one to twenty carbon atoms in one or more side chains. Among such mercaptan compounds are the methylhexyl, ethylhexyl, methylheptyl, ethylheptyl, propylheptyl, methyloctyl, methylnonyl and other mercaptans corresponding in molecular carbon atom structure to the above branched-chain hydrocarbons.

Such activated thiourea does not form adducts with organic compounds having less than five carbon atoms per molecule or having a straight or an aromatic structure.

It is obvious from the foregoing discussion that urea and thiourea when activated with the nitrogen-containing activators of this invention will form adducts with a large number of different compounds. Although there is set forth above examples of numerous compounds which will form such adducts, numerous other compounds not specifically mentioned herein will similarly form adducts and a comprehensive, exhaustive enumeration of such compounds is highly impractical and would not aid in an understanding of this invention. Obviously, one skilled in the art, upon reading the present disclosure, can determine other adduct-forming compounds not specifically mentioned herein by means of mere routine test and without the exercise of inventive genius.

According to one of the embodiments of this invention, one or more of the straight carbon atom chain compounds of the above types which are admixed with one or more of the branched carbon atom chain compounds and/or with aromatic organic compounds can be separated therefrom by forming a solid crystalline adduct between the straight-chain compound and urea activated with one of the nitrogen activators of this invention. Upon contacting such a mixture of different classes of organic compounds with the activated urea or with urea in the presence of one or more of the activating agents of this invention, the straight-chain compound and the urea will combine to form a solid adduct which can be readily removed, such as by filtration, from the non-adduct forming branched-chain and/or aromatic organic compounds. Further, one or more branched carbon atom chain compounds of the classes denoted above can be separated from its admixture with one or more of the straight carbon atom chain compounds of the classes denoted above and/or with aromatic organic compounds by contacting the mixture with thiourea in the presence of one or more of the nitrogen-containing activators of this invention. The branched-chain compound forms a solid crystalline adduct with the thiourea and can be readily separated, as by filtration, from the non-adduct forming straight-chain and/or aromatic organic compounds.

The separated urea or thiourea adduct can be washed, if desired, to remove any undesirable non-adduct forming compounds therefrom and then decomposed to yield the organic compound which formed the adduct and urea or thiourea. The decomposition can be effected by contacting the adduct with water at a temperature between 35 and 210° F., preferably between 65 and 90° F. Alternatively, the adduct can be decomposed by merely heating the adduct in the absence of water to a temperature between 135 and 250° F., preferably between 150 and 200° F.

The adduct forming reaction with urea or thiourea is an equilibrium one and excessively high temperatures preclude the reaction reaching completion. The reaction can be effected at a temperature within the range of minus 75 to 170° F., preferably 30 to 100° F. The reaction should be carried out in the liquid phase and the pressure need be sufficient to merely establish and maintain such phase, and is usually about atmospheric, but can be higher or lower when suitable. When the compound which is to form the desired adduct or when the mixture of compounds or one of them is a solid or highly viscous at the operation temperature of the adduct forming reaction, such compound or compounds can be dissolved or suspended in a suitable solvent. The solvent should be non-adduct forming and should be substantially inert chemically to the urea or thiourea and to the nitrogen-containing activator. Among such solvents which can be used are the low boiling normal hydrocarbons containing from three to five carbon atoms such as propane, butane, pentane and isobutane, the low boiling alcohols containing from one to four carbon atoms such as methanol, ethanol, propanol, isopropanol, butanol and isobutanol, various cyclic organic compounds such as benzene and toluene and other solvents including ketones having from three to five carbon atoms such as diethyl ketone and ethers having from four to six carbon atoms such as diethyl ether, dipropyl ether and diisopropyl ether.

The reaction time is that necessary to effect the desired amount of reaction and can be from less than one minute to 24 hours or more. The rate of reaction depends upon the particular reactants and the temperature and consequently the most desirable reaction time will not necessarily be the same for two different adduct-forming organic compounds but can be readily determined for any given instance by mere routine test.

The process can be carried out in conventional apparatus such as reaction vessels, settling basins and the like. It can be either batchwise or continuous.

A composition of matter comprising urea or thiourea and one or more of the above defined nitrogen-containing activators in the concentrations set forth is useful as a separating agent in resolving mixtures of adduct-forming and non-adduct forming compounds.

The following examples are given to further demonstrate the nature of this invention.

*Example I*

Urea was dissolved in a number of different nitrogen-containing activators as shown in the table below to form saturated solutions of urea therein. To the urea-saturated activator was then added various organic compounds indicated below in a ratio of approximately 10 parts of said urea-saturated activator to one to two parts of organic compound. The experiments were performed at a temperature of 72° F. and at atmospheric pressure.

| Exp. No. | Nitrogen Base Compound Activator | Organic Compound | Results |
| --- | --- | --- | --- |
| 1 | 70 weight percent aqueous monoethylamine. | n-cetane | Solid adduct formed immediately. |
| 2 | do | octadecene | Do. |
| 3 | do | 1-decene | Do. |
| 4 | do | n-octane | Do. |
| 5 | do | Venezuela kerosene fraction. | Do. |
| 6 | do | n-heptane | Adduct formed in less than 5 minutes. |
| 7 | do | No. 2 jet fuel | Do. |
| 8 | do | Solvent refined 5W oil. | Solid adduct formed upon standing. |
| 9 | Anhydrous pyridine | n-cetane | Solid adduct formed upon standing from 5 to 15 minutes. |
| 10 | 50 weight percent aqueous alpha-picoline. | do | Do. |
| 11 | 70 weight percent aqueous monoethylamine. | methyl ester of undecanoic acid. | Immediately formed an adduct. |
| 12 | do | 2-amino-n-octane | Do. |
| 13 | do | n-heptanol | Do. |
| 14 | do | n-octanol | Do. |
| 15 | do | n-decanol | Do. |
| 16 | do | di-n-butyl ketone | Do. |
| 17 | do | n-heptyl bromide | Do. |

*Example II*

The same experiments were performed in the same manner as those of Example I except that thiourea was substituted for urea to form a thiourea-saturated activator solution. Even after prolonged standing, the activated thiourea did not yield any adduct with the above organic compounds.

*Example III*

Thiourea was dissolved in a number of different nitrogen-containing activators as shown in the table below to form saturated solutions of thiourea therein. The thiourea-saturated activator was then admixed with the various organic compounds indicated below in a ratio of ten parts of said thiourea-saturated activator to one to two parts of organic compound. The experiments were performed at a temperature of 72° F. and at atmospheric pressure.

| Exp. No. | Nitrogen Base Compound Activator | Organic Compound | Results |
| --- | --- | --- | --- |
| 1 | 70 weight percent aqueous monoethylamine. | iso-octane | Adduct formed immediately. |
| 2 | do | HF alkylate fraction boiling between 360 and 425° F. | Do. |
| 3 | do | n-octane | No adduct formed. |
| 4 | do | n-cetane | Do. |
| 5 | Anhydrous pyridine | iso-octane | Adduct formed immediately. |
| 6 | do | n-pentane | No adduct formed. |
| 7 | do | n-octane | Do. |
| 8 | do | n-cetane | Do. |
| 9 | 70 weight percent aqueous monoethylamine. | diisobutyl ketone | Adduct formed. |
| 10 | do | cetyl dimethylamine | Do. |
| 11 | do | 4-methylpentanol-2 | No adduct formed. |
| 12 | do | methyl-n-butyl carbinol. | Do. |

*Example IV*

A saturated solution of urea in 25 vol. % aqueous ethylenediamine formed an adduct with n-cetane in 2 to 3 minutes. N-octane also formed an adduct with the above solution.

*Example V*

A saturated urea solution in dilute aqueous trimethylamine formed an adduct with n-cetane in less than four minutes. This adduct formed much less rapidly when only an aqueous solution is used under the same conditions.

*Example VI*

Urea wetted with di-n-propyl amine formed an adduct with n-cetane within a few minutes.

*Example VII*

A concentrated solution of urea in ethanolamine produced a urea adduct with n-cetane but the adduct formation was extremely slow due to the high viscosity of the solution. However, with a concentrated solution of urea in aqueous ethanolamine (1 vol. % of amine to 2 vol. % of water) the n-cetane adduct formed within a few minutes.

*Example VIII*

A saturated solution of urea in formamide produced an adduct with n-cetane, n-dodecane, n-decene, n-octane and n-heptane. The rate of adduct formation was rapid with n-cetane but the rate became progressively less with the lower molecular weight compounds. However, the n-heptane adduct formation appeared to be complete in approximately 1 to 1½ hrs.

With an HF alkylate isoparaffin fraction boiling between 360 and 425° F., no adduct was formed in 23 hours, under the same conditions.

While the invention has been described in connection with present preferred embodiments thereof, it is to be understood that this description is illustrative only and is not intended to limit the invention, the scope of which is defined by the appended claims.

I claim:

1. In a process for preparing an adduct between an amide selected from the group consisting of urea and thiourea and an organic compound capable of forming an adduct therewith, the improvement which comprises forming said adduct in the presence of an aqueous solution of monoethylamine.

2. In a process for preparing an adduct of thiourea with a branched carbon atom chain organic compound having from 5 to 50 carbon atoms in the straight-chain portion of the molecule and from 1 to 20 carbon atoms in a side chain and selected from the group consisting of secondary and tertiary amines having at least 7 carbon atoms in the straight-chain portion of the molecule, hydrocarbons, mercaptans, alcohols, and ketones, the improvement which comprises activating said thiourea with an aqueous solution of monoethylamine.

3. In a process for preparing an adduct of urea with a straight carbon atom chain organic compound having from 6 to 50 carbon atoms per molecule and selected from the group consisting of straight carbon atom chain hydrocarbons, primary alcohols, mercaptans, ketones, alkyl and alkenyl bromides, amines having at least 8 carbon atoms in the straight-chain portion of the molecule, and esters of organic acids, the improvement which comprises activating said urea with an aqueous solution of monoethylamine.

4. A process for separating a straight carbon atom chain organic compound having from 6 to 50 carbon atoms per molecule and selected from the group consisting of straight carbon atom chain hydrocarbons, primary alcohols, mercaptans, amines having at least 8 carbon atoms per molecule, ketones, alkyl and alkenyl bromides, and esters of organic acids from admixture with a compound selected from the group consisting of a branched carbon atom chain organic compound and an aromatic organic compound, which comprises contacting said admixture with urea at a temperature in the range 30 to 100° F. and atmospheric pressure in the presence of an aqueous solution containing from .01 to 20 mols, per mol of urea, of monoethylamine; separating resulting solid adduct from remaining liquid; and heating said adduct to a temperature in the range 150 to 200° F. so as to obtain straight carbon atom chain organic compound as a product of the process.

5. In a process for preparing an adduct of urea with a straight carbon atom chain hydrocarbon containing from 6 to 50 carbon atoms per molecule, the improvement which comprises activating said urea with an aqueous solution of monoethylamine.

6. In a process for preparing an adduct of urea with n-cetane, the improvement which comprises contacting from 1 to 2 parts of n-cetane with about 10 parts of an aqueous solution containing about 70 weight per cent of monoethylamine and saturated with urea, at a temperature in the range of 65 to 90° F. at an atmospheric pressure.

7. In a process for preparing an adduct of thiourea with iso-octane, the improvement which comprises contacting from 1 to 2 parts of iso-octane with about 10 parts of anaqueous solution containing about 70 weight per cent of monoethylamine and saturated with thiourea, at a temperature in the range of 65 to 90° F. and at atmospheric pressure.

References Cited in the file of this patent

UNITED STATES PATENTS

| Number | Name | Date |
|---|---|---|
| 1,785,730 | Davis | Dec. 23, 1930 |
| 2,249,183 | Simons | July 15, 1941 |
| 2,253,528 | Ollin | Aug. 26, 1941 |
| 2,275,809 | Roberts | Mar. 10, 1942 |
| 2,304,624 | Burke | Dec. 8, 1942 |
| 2,376,008 | Riethof | May 15, 1945 |
| 2,499,820 | Fetterly | Mar. 7, 1950 |
| 2,518,677 | Garner et al. | Aug. 15, 1950 |
| 2,520,715 | Fetterly | Aug. 25, 1950 |
| 2,520,716 | Fetterly | Aug. 25, 1950 |
| 2,546,328 | Arabian et al. | Mar. 27, 1951 |
| 2,557,257 | Melrose | June 19, 1951 |
| 2,569,984 | Fetterly | Oct. 2, 1951 |
| 2,577,202 | Lien et al. | Dec. 4, 1951 |
| 2,588,602 | Adams et al. | Mar. 11, 1952 |
| 2,606,140 | Arnold et al. | Aug. 5, 1952 |
| 2,627,513 | Arey | Feb. 3, 1953 |
| 2,642,423 | Gorin | June 16, 1953 |
| 2,681,904 | Hyer et al. | June 22, 1954 |